United States Patent [19]

Taylor

[11] 3,991,702

[45] Nov. 16, 1976

[54] TURNS-COUNTING DIAL

[76] Inventor: Anthony E. Taylor, P.O. Box D, La Verne, Calif. 91750

[22] Filed: July 18, 1975

[21] Appl. No.: 596,982

[52] U.S. Cl. ................................ 116/115; 235/103; 338/149

[51] Int. Cl.[2] .......................................... G01P 13/00

[58] Field of Search ........................ 116/115, 124 A; 338/149; 235/103

[56] References Cited

UNITED STATES PATENTS

| | | | |
|---|---|---|---|
| 904,332 | 11/1909 | Kahan | 116/115 X |
| 2,805,636 | 9/1957 | Smith | 116/115 |
| 3,162,172 | 12/1964 | Hardison | 338/149 X |
| 3,757,732 | 9/1973 | Frey, Jr. | 116/115 |

*Primary Examiner*—Donald E. Watkins

*Assistant Examiner*—Daniel M. Yasich

*Attorney, Agent, or Firm*—Christie, Parker & Hale

[57] ABSTRACT

A turns-counting dial for multi-turn potentiometers and the like, and having an intermittent-motion mechanism connecting a shaft-mounted control knob to a turns-counting ring. An interrupted-tooth gear coupled to the turns-counting ring is locked against rotation except during turns-counting movement by a flange on a coupling ring positioned radially inwardly of the gear within the dial. This arrangement provides secure locking of the turns-counting dial, provides flexibility in the number of turns to be counted, enables use of relatively low-tolerance parts, and strengthens the intermittent-motion mechanism against breakage or distortion if torque is applied to the turns-counting ring.

5 Claims, 9 Drawing Figures

Fig. 2
Fig. 1
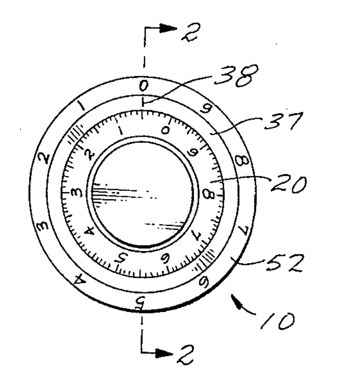
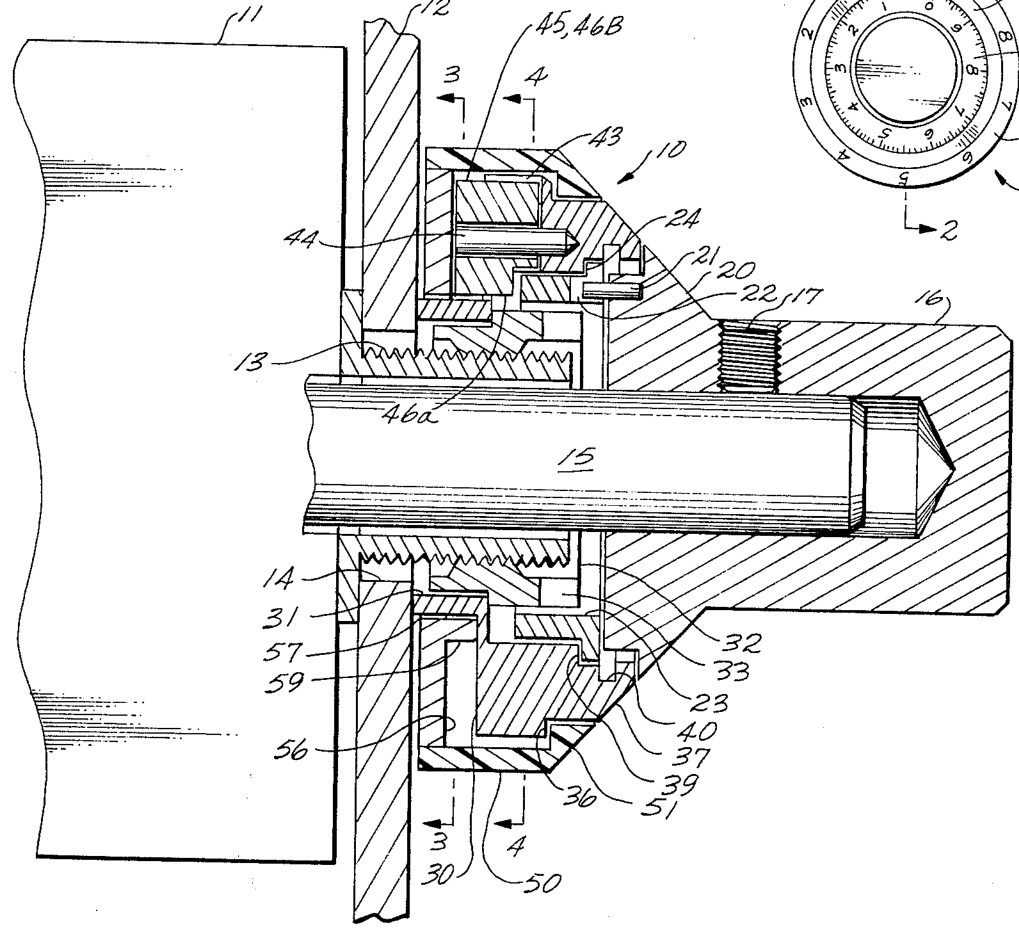
Fig. 3
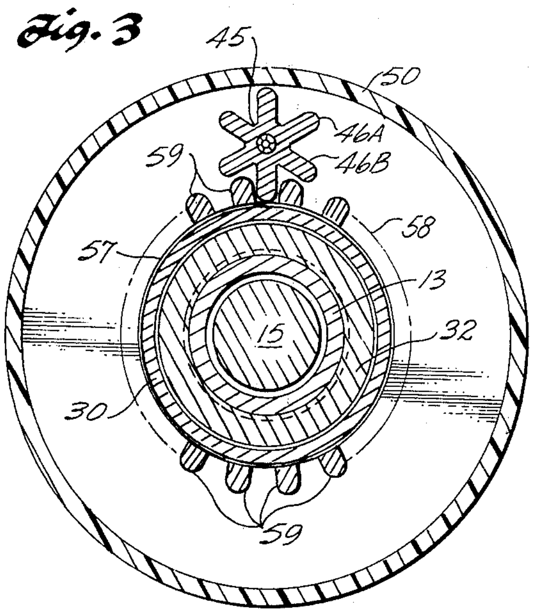
Fig. 4
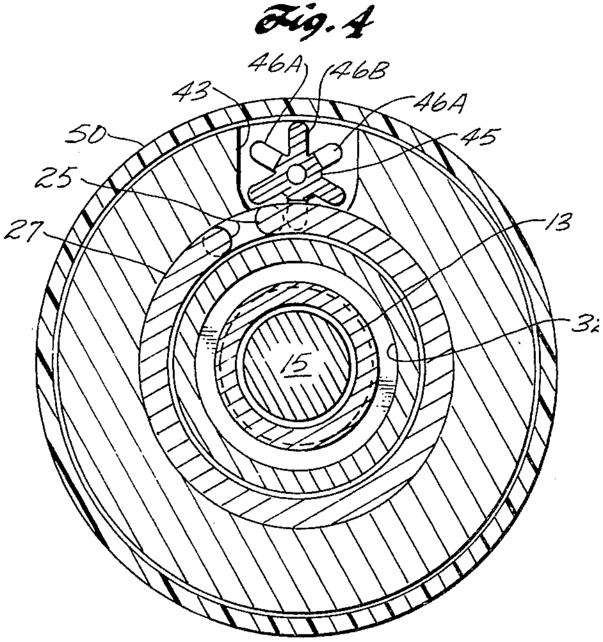

TURNS-COUNTING DIAL

BACKGROUND OF THE INVENTION

Turns-counting dials have been commercially available for many years in a variety of styles, and typical units are disclosed in U.S. Pat. Nos. 2,746,417—McCord, 2,805,636—Smith, and 3,450,091-Wajdik. These dials are used to display the angular position of multi-turn devices such as potentiometers which may be rotated through, for example, 10 full turns.

A knob of the dial is secured to a shaft of the device, and a "fraction" scale on the knob displays shaft position from 0°–360° (the scale is commonly graduated in decimal form to show 100 counts for one full revolution). A second "turns" scale is mechanically coupled to the knob, and is graduated in the number of turns to be counted. The coupling mechanism moves the turns scale by one count for each full rotation of the knob. The two scales thus display the total rotational displacement of the shaft from a zero or starting position.

The coupling mechanism in these dials has several functions. First, the mechanism rotates the turns scale through an angle equal to one count on the scale for each rotation of the knob. Second, the mechanism locks the turns scale against inadvertent rotation arising from ambient vibration, or from manipulation of the scale by the operator.

In the dials disclosed in the aforementioned Smith and Wajdik patents, a Geneva mechanism is used to effect intermittent coupling between the knob and turns scale. An annular shoulder on the knob (or an intermediate drive ring) is positioned adjacent the periphery of the Geneva indexing wheel to lock the wheel and turns scale during dwell operation between once-per-rotation advance movements.

The McCord patent shows another type of coupling mechanism using an intermittent-tooth "mutilated" gear having teeth which are alternately of full and partial width. All teeth on this gear are meshed with a turns-scale gear, and an annular locking shoulder on a locking ring positioned radially outward of the mutilated gear engages the tips of the full teeth to lock the turns scale except when the gear is engaged by an inwardly facing gear segment during once-per-turn advance motion.

The dial of this invention has an improved intermittent-motion mechanism which facilitates dial miniaturization which is important where the dial must be mounted on a very small panel, or in applications requiring the mounting of a large number of dials in a limited space. The improved mechanism also provides secure mechanical locking of the turns dial without requiring shielding of the turns dial against operator access to protect the relatively fragile coupling devices used in earlier designs. The entire surface of the turns scale can thus be made visible to the operator to eliminate reading error during transitional movement of the turns scale. This has been found to be an important feature in turns-counting dials, but has been avoided in some prior-art devices to prevent inadvertent torquing of the turns scale (either in regular use of the dial, or particularly during installation of the dial on a panel-mounted potentiometer or similar device) which could distort or break the coupling mechanism. The new design is also readily modified to count various numbers of turns, or to advance the turns scale for fractional rotation of the control knob.

SUMMARY OF THE INVENTION

Briefly stated, this invention relates to a turns-counting dial for use with a panel-mounted multi-turn potentiometer or similar device having a shaft rotatable through a plurality of turns. The dial includes a stationary base adapted to be clamped to the panel, and having a central opening therethrough to receive the shaft of the multi-turn device. A knob of the dial is adapted to be rigidly secured to the shaft to be rotatable therewith with respect to the base. A turns-counting ring is rotatably mounted on the base, and a first gear on this ring is concentric with the shaft.

A second interrupted-tooth gear is rotatably mounted on the base, and has a portion with an even number of teeth of alternately full and partial width teeth extending generally parallel to the shaft axis. The first gear is meshed with a rear portion of the second gear, and the rear portion may have a different gear form than the form defined by the full and partial width teeth. A coupling ring is rotatably mounted on the base concentric with the shaft, and is connected to the knob to rotate therewith. The coupling ring has an annular locking shoulder positioned to extend convexly into the periphery of the second gear to clear and ride over one of the partial-width teeth while simultaneously blocking rotation of the adjacent full-width teeth. The shoulder has a clearance slot therethrough, and a pair of coupling pins extend from the ring on opposite sides of the slot. The pins project axially from the shoulder to be engageable with both full- and partial-width teeth of the second gear. The turns-counting ring and second gear are thereby locked by the locking shoulder against rotation except when a coupling pin is rotated against a partial-width tooth to rotate the second gear and drive an adjacent full-width tooth through the clearance slot.

The second gear has an axis of rotation which is spaced radially outward of the periphery of the convex locking shoulder of the coupling ring. Preferably, the base defines an annular shoulder, and the coupling ring has an annular flange adjacent the base shoulder to limit axial movement of the coupling ring toward the second gear to prevent interference between the partial-width teeth and locking shoulder. Rotational connection of the knob and coupling ring is preferably effected by an axially extending pin secured to the knob and received in a slot in the coupling ring, this arrangement providing limited axial freedom of the coupling ring with respect to the knob and base. In a preferred form, the turns-counting ring has an outer annular surface bearing a turns scale, and the full scale is exposed and fully visible when the dial is assembled.

DESCRIPTION OF THE DRAWING

FIG. 1 is a front view of a turns-counting dial;

FIG. 2 is a sectional side elevation of the dial on line 2—2 of FIG. 1;

FIG. 3 is a view on line 3—3 of FIG. 2;

FIG. 4 is a view on line 4—4 of FIG. 2;

DESCRIPTION OF THE PREFERRED EMBODIMENT

Figure 5:
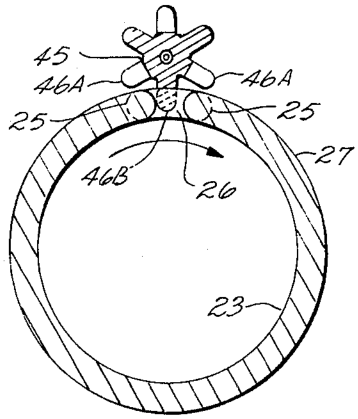
FIG. 5 is a partial view similar to FIG. 4, but showing components of a coupling mechanism in an intermediate position.

Referring to FIGS. 1 and 2, a turns-counting dial 10 and a rotary device 11 such as a multi-turn potentiometer are secured together on opposite sides of a panel 12. Device 11 has an externally threaded mounting bushing or boss 13 extending through a hole 14 in the panel. A rotatable control shaft 15 extends from boss 13, and the shaft is rigidly secured to a knob 16 of the turns-counting dial by a set screw 17.

Figure 9:
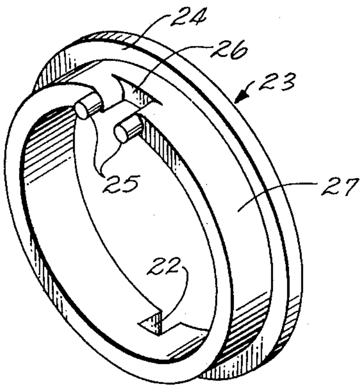
FIG. 9 is a perspective view of a coupling ring.

Knob 16 has a bezeled surface defining a fraction scale 20 (FIG. 1) typically divided into 100 graduations. A pin 21 is rigidly secured to and extends from the rear surface of the knob to be received in a slot 22 of a coupling ring 23 shown in greater detail in FIG. 9.

Coupling ring 23 has an outwardly extending flange at its front end defining a rearwardly facing annular shoulder 24. A pair of gear-coupling pins 25 are spaced apart on opposite sides of a clearance slot 26 extending through the wall of the coupling ring. The outer surface of the coupling ring defines an annular locking shoulder 27 which is interrupted by slot 26.

Figure 7:
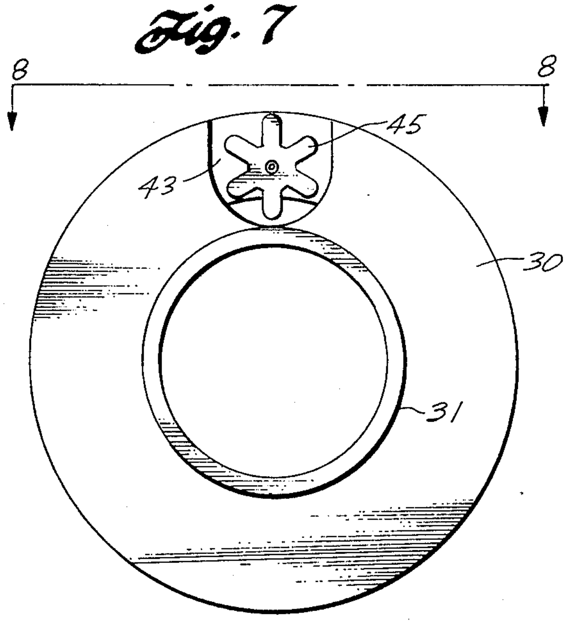
FIG. 7 is a rear elevation of a base and interrupted gear used in the dial.
Figure 8:
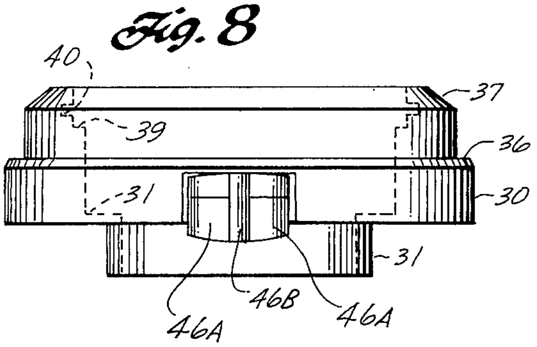
FIG. 8 is a top view on line 8—8 of FIG. 7.

A stationary annular stator or base 30 (FIGS. 2, 7 and 8) has a rearwardly extending annular flange 31 bearing against the front surface of panel 12 around hole 14. The base has a central opening therethrough to receive mounting boss 13, and a clamping nut 32 is threaded on the boss to bear against the forward end of flange 31. Nut 32 thus rigidly secures both base 30 and device 11 on opposite sides of panel 12. The clamping nut has a pair of opposed notches 33 so it can be rotated by a conventional spanner wrench.

Base 30 is enlarged in diameter forwardly of flange 31, and the outer surface of the enlarged portion defines an annular shoulder 36 and an annular tapered or bezeled surface 37 bearing an index mark or lubber line 38 (FIG. 1). The inside surface of hollow base 30 also defines an outwardly extending annular shoulder 39 and an annular groove 40 spaced slightly forward of shoulder 39. The function of groove 40 is to receive a conventional snap ring (not shown) to hold coupling ring 23 in place before the dial is mounted on panel 12 and shaft 15.

A radially extending slot 43 is cut through the wall of base 30, and gear-mounting shaft 44 is rigidly secured to the base to extend into the slot. A mutilated or interrupted-tooth gear 45 is rotatably mounted on shaft 44.

Gear 45 has an even number of teeth 46, all of which extend from the rear face (the left end of the gear is viewed in FIG. 2) toward the front face of the gear. Alternate teeth 46A, however, are terminated (by approximately one-third of the gear width) short of the gear front face. The remaining teeth (designated 46B) extend along the full width of the gear.

A turns-counting ring 50, having an inwardly extending bezeled portion 51 at its forward end, makes a rotatable fit on the outer surface of base 30 against shoulder 36. A turns scale 52 (FIG. 1) is displayed on the front surface of bezeled portion 51. The rear end of ring 50 is spaced slightly from panel 12 so the ring can turn freely on base 30 without dragging on the panel.

A circular gear plate 56 makes a tight press fit (or is cemented or otherwise secured) within the rear end of turns-counting ring 50 after the ring is fitted over base 30 as shown in FIG. 2. The gear plate has a central circular opening 57 large enough to clear flange 31 of base 30, whereby the gear plate and turns-counting ring are concentric with and rotatable as a unit around the stationary base.

Gear plate 56 has on its front face a gear 58 having integrally formed teeth 59 extending radially outwardly from central opening 57 and forwardly toward the main body of base 30. As shown in FIG. 3, gear 45 is constantly meshed with gear 58 because both teeth 46A and 46B extend rearwardly to be adjacent the front surface of the gear plate.

Preferably, the teeth of both gears 45 and 58 are rounded in the form of a half circle (FIG. 3), and cylindrical pins can also be used for the teeth if desired. It is inexpensive to manufacture gears having this form, and the gears mesh well to minimize backlash movement which could result in misalignment of the digits on turns scale 52 with lubber line 38. The gears are preferably made of metal, but may also be made of plastic because a material structurally weaker than metal is nevertheless adequate in view of the excellent locking action of the dial as discussed below.

Installation of dial 10 is straightforward, the first step being to secure the dial and device 11 to panel 12 by tightening clamping nut 32 on boss 13 as described above. All of the dial components are in the position shown in FIG. 2 at this point, with the exception of knob 16 which has not yet been installed. Shaft 15 is then rotated to position device 11 at a "zero" starting point, and knob 16 is secured to the shaft with both fraction scale 20 and turns scale 52 zeroed with respect to lubber line 38. Coupling ring 23 is rotated as necessary during installation of the knob to insure that pin 21 is engaged in slot 22. Shaft 15 and knob 16 are locked together by set screw 17, and the fractional-turn position of the shaft is accordingly indicated by reading scale 20 against lubber line 38.

Figure 6:
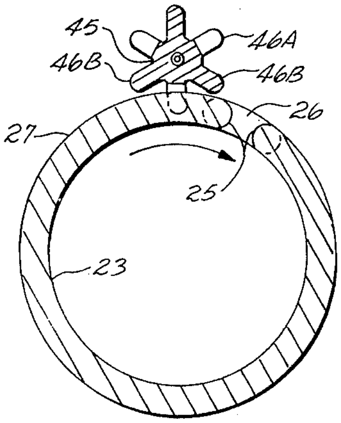
FIG. 6 is a view similar to FIG. 5 showing the coupling mechanism in a locked position.

When the dial and device are in a zero position, coupling pins 25 on the coupling ring are positioned just beyond gear 45 as shown in FIG. 6. In this position, annular locking shoulder 27 of the coupling ring extends over one of the partial-width short teeth 46A of gear 45 in juxtaposition to adjacent full-width teeth 46B. Gear 45 is thus locked against rotation because one of the adjacent full teeth 46 will abut the locking shoulder upon the slightest rotary movement of gear 45. Gear 58 (which is constantly in mesh with gear 45) is accordingly also locked against rotation, and turns-counting ring 50 remains stationary during fractional movement of knob 16.

When knob 16 has been rotated clockwise through almost one full rotation, coupling ring 23 and gear 45 are in the relative position shown in FIG. 4. In this position, coupling pins 25 (which extend rearwardly from the coupling ring beyond the truncated forward ends of short teeth 46A) are about to come into mesh with the short tooth 46A which extends radially inwardly beneath locking shoulder 27. As clockwise rotation of the knob is continued, the leading one of the two coupling pins contacts this short tooth 46A, and initiates counterclockwise rotation of gear 45. The locking action of shoulder 27 is then released because the shoulder is interrupted by clearance slot 26, and adjacent full tooth 46B rotates into the clearance slot as shown in FIG. 5. Further rotation of knob causes the trailing one of coupling pins 25 to drive full tooth 46B out of the clearance slot, thereby rotating the next adjacent short tooth 46A under locking shoulder 27 in the locked position shown in FIG. 6.

Gear 45 is thus decoupled from locking shoulder 27 only during the short amount of rotation necessary to move pins 25 past teeth 46, this motion effecting a rotation of gear 45 equal to 360 degrees divided by the total number of short teeth 46A. If gear 45 has three short teeth and three full teeth as shown in the drawings, each full rotation of knob 16 thus produces a 120 degree rotation of the gear. If rotary device 11 is, for example, a ten-turn device, gear 58 has twenty teeth whereby turns-counting ring 50 is advanced 36° or one graduation for each full rotation of the knob.

During "dwell" operation between either clockwise or counterclockwise movements (the intermittent-drive arrangement of the dial is bidirectional) of the turns-counting ring, gear 45 remains locked against rotation by annular locking shoulder 27. A central feature of the invention is that the locking shoulder is positioned radially inwardly (with respect to the central axis of the dial and shaft 15) of the axis of rotation of gear 45. This positioning is important because it positions the convex outer surface of locking shoulder 27 to extend further between full teeth 46B toward the axis of rotation of gear 45. Prior-art dials have positioned the annular locking shoulder radially outward of the axis of rotation of the interrupted-tooth gear, and a concave inner surface of the shoulder is used to effect locking. The concave inner surface thus curves away from and contacts only the teeth tips rather than extending into the teeth as in the arrangement herein disclosed.

This feature becomes particularly important when the turns-counting dial is miniaturized, and an unreliable lock is provided by a locking shoulder positioned radially outward of gear 45. Reduction in gear size, coupled with tolerance buildups of the component parts, can result in complete loss of lock, or perhaps in jamming of the moving parts. This is especially true when plastic components are used because these parts lack the strength of metal components and are more susceptible to distortion or breakage unless a very secure locking action is provided.

Interrupted-tooth gear 45 is also more rugged and reliable than Geneva-wheel mechanisms which have been used in prior-art turns-counting dials. Geneva wheels have thin and structurally weak portions adjacent radially extending notches in the wheel, and these portions are easily bent or broken unless the drive-system components are in perfect alignment. In addition, the outer surface of the wheel approaches a circular shape as the number of lobes of the Geneva wheel is increased or the diameter of the wheel is reduced, and an unreliable locking action again results.

Although gear 58 has been shown as positioned radially inwardly of gear 45, it should be noted that driven gear 58 can also be positioned radially outwardly of gear 45 adjacent the periphery of gear plate 56. This is an important feature if a large number of teeth 59 are to be provided to enable counting of a large number of turns. The direction of rotation of the turns-counting dial may also be reversed if desired by this repositioning of the driven gear.

By varying the size and number of teeth on the gears, the dial assembly can be made to count from 2 to 40 or more turns without departing from the basic design. The dial is also easily converted to count fractional turns simply by adding additional pairs of coupling pins (and associated slot 26) to the coupling ring. The axial (rather than radial) extension of coupling pins 25 into gear 45 facilitates dial miniaturization without loss of pin and gear strength or coupling reliability.

Rearward movement of coupling ring 23 is limited by shoulder 39 to avoid jamming which could result if locking shoulder 27 interferes with short teeth 46A of the interrupted-tooth gear. Coupling ring 23, turns-counting ring 50 (and gear plate 56 which is rigidly secured thereto), and gear 45 thus all have slight axial freedom which insures smooth dial operation and enables the parts to be made to lower tolerances and by simpler machine operations. This arrangement also accommodates any shaft wobble which may be present if the shaft is not correctly aligned.

Another important feature of the axial stop provided by shoulder 39 for coupling ring 23 is that gear 46 may be formed as a three-level gear which enables variation of the number of turns to be counted. Gear 46 is shown as a simple straight-tooth gear for clarity, but the gear operates at three axial levels as follows:

a. The forward level (approximately one-third of the total gear width) of the gear consists of those portions of teeth 46B which coact with locking shoulder 27 to lock the turns-counting ring.

b. The middle level (approximately the center one-third of the total gear width) of the gear consists of those portions of both teeth 46A and 46B which coact with coupling pins 25 to effect once-per-turn rotation of gear 46.

c. The rear level (approximately the rear one-third of the total gear width) of the gear consists of those portions of both teeth 46A and 46B which mesh with driven gear 58.

The axial extent of pins 25 can be confined to the forward and middle levels of gear 46 due to the position control effected by shoulder 39, and the pins can be intentionally terminated short of the rear level of the gear.

The significance of this is that the rear level can be a gear form which differs from the form used in the forward and middle levels because the coupling pins need not extend into and mesh with the teeth of the rear level. Accordingly, gear 46 can be provided in various interchangeable forms to achieve the following objectives:

a. The number of teeth forming the forward and intermediate levels can be varied independently of the rear-level teeth to vary the extent of rotation of gear 46 which occurs during each turns-counting cycle when the gear is rotated by coupling pins 25.

b. The number of teeth and the pitch diameter of the rear level can be varied independently of the forward- and intermediate-level teeth to change the gear ratio of gears 46 and 58. This gear controls the amount of rotation of the turns-counting ring for a given rotation of gear 46, and the rear level thus acts as a speed-changing pinion or idler gear.

If desired, the rear level can be isolated from the other levels by a radially extending flange, and there is no problem of the coupling pins dragging on or interfering with the flange due to the controlled positioning of the coupling ring.

There has been described a turns-counting dial using spur gears in an intermittent-motion coupling mechanism, and featuring a circular locking shoulder which is positioned radially inward of an interrupted-tooth gear which is locked between turns-counting movement of a turns ring. The secure locking provided by this arrangement enables the entire turns scale to be exposed without fear of breakage or stripping of the intermittent-motion mechanism during installation of the dial, or at any other time when torque is applied to the turns-counting ring.

What is claimed is:

1. A turns-counting dial for use with a multi-turn device having a rotatable shaft and being adapted for mounting on a panel, comprising:

a stationary base adapted to be clamped to the panel and having a central opening therethrough to receive the shaft;

a knob adapted to be secured to the shaft to be rotatable therewith with respect to the base;

a turns-counting ring rotatably mounted on the base, and a first gear on the turns-counting ring concentric with the shaft;

a second interrupted-tooth gear rotatably mounted on the base, the second gear having a portion with an even number of teeth of alternately full and partial width extending generally parallel to the shaft axis, the first and second gears being meshed;

a coupling ring rotatably mounted on the base concentric with the shaft and connected to the knob to rotate therewith, the coupling ring defining an annular locking shoulder positioned to extend convexly into the periphery of the second gear to clear and ride over one of the partial-width teeth while blocking rotation of the adjacent full-width teeth, the shoulder having a clearance slot therethrough and a pair of coupling pins secured to the coupling ring on opposite sides of the slot, the pins extending axially from the shoulder to be engageable with both full- and partial-width teeth of the second gear, whereby the turns-counting ring and second gear are locked against rotation by the locking shoulder until one of the coupling pins is rotated against a partial-width tooth to rotate the second gear with an adjacent full-width tooth passing through the clearance slot.

2. The dial defined in claim 1 wherein the second gear has an axis of rotation which is spaced radially outward of the periphery of the annular locking shoulder of the coupling ring.

3. The dial defined in claim 2 wherein the base defines an annular shoulder and the coupling ring has an annular flange adjacent the base shoulder to limit axial movement of the coupling ring toward the second gear, whereby interference between the partial-width teeth and locking shoulder is prevented.

4. The dial defined in claim 3 wherein rotational connection of the knob and coupling ring is effected by an axially extending pin secured to the knob and received in a slot in the coupling ring to couple the knob and coupling ring rotationally while permitting limited axial freedom therebetween.

5. The dial defined in claim 4 wherein the turns-counting ring has an outer annular surface bearing a turns scale, the full scale being exposed and visible.

* * * * *